United States Patent [19]
Watson et al.

[11] Patent Number: 6,073,648
[45] Date of Patent: Jun. 13, 2000

[54] METAL ELEMENT HAVING A LAMINATED COATING

[75] Inventors: James L. Watson; John M. Watson, both of Houston; Robert L. White, Hockley; William P. Ferree, Houston, all of Tex.

[73] Assignee: Watson Grinding and Manufacturing Company, Houston, Tex.

[21] Appl. No.: 09/299,411

[22] Filed: Apr. 26, 1999

[51] Int. Cl.[7] ........................................................ F16L 7/00
[52] U.S. Cl. .............................. 137/375; 137/1; 251/368; 251/315.03; 251/315.04; 106/14.33
[58] Field of Search ............................... 251/368, 315.03, 251/315.04; 137/375, 1; 106/14.33; 138/149

[56] References Cited

U.S. PATENT DOCUMENTS

| | | | |
|---|---|---|---|
| 2,083,228 | 6/1937 | Geyer | 23/292 |
| 3,413,723 | 12/1968 | Wagner et al. | 32/8 |
| 3,568,709 | 3/1971 | Fitting | 137/375 |
| 4,210,167 | 7/1980 | Koppe et al. | 137/375 |
| 4,338,360 | 7/1982 | Cavanagh et al. | 427/247 |
| 4,612,955 | 9/1986 | Purvis | 137/375 |
| 4,697,615 | 10/1987 | Tsuchimoto et al. | 137/340 |
| 4,714,234 | 12/1987 | Falk et al. | 251/129.17 |
| 4,771,803 | 9/1988 | Berchem et al. | 137/375 |
| 4,791,953 | 12/1988 | Berchem | 137/375 |
| 4,795,133 | 1/1989 | Berchem et al. | 251/171 |
| 4,932,432 | 6/1990 | Berchem | 137/375 |
| 4,975,314 | 12/1990 | Yano et al. | 428/213 |
| 5,055,361 | 10/1991 | Dunn et al. | 428/633 |
| 5,123,439 | 6/1992 | Powers | 137/375 |
| 5,353,832 | 10/1994 | Berchem | 137/375 |
| 5,503,193 | 4/1996 | Nygaard | 138/149 |
| 5,522,433 | 6/1996 | Nygaard | 138/149 |
| 5,713,394 | 2/1998 | Nygaard | 138/149 |
| 5,819,774 | 10/1998 | Beardsley et al. | 137/1 |
| 5,823,224 | 10/1998 | Gomez | 137/240 |
| 5,875,814 | 3/1999 | Osborne | 137/375 |

*Primary Examiner*—A. Michael Chambers
*Assistant Examiner*—Thomas L. McShane
*Attorney, Agent, or Firm*—Akin, Gump, Strauss, Hauer & Feld

[57] ABSTRACT

A laminated coating protects a metal substrate in a highly corrosive and highly erosive environment. A coating of a noble metal, such as gold, is bonded to the metal substrate, such as by electroplating or by flame spray. The noble-metal coating protects the metal substrate from the corrosive effects of a process fluid. A ceramic material, such as chromium oxide or titanium dioxide, is bonded to the noble-metal coating. Ceramic materials resist abrasion very well, which protects the underlying noble-metal coating from the erosive/abrasive effects of the process solution, which may contain suspended solids that are highly abrasive. However, the ceramic material is somewhat porous, which allows some seepage of the process fluid. The metal substrate is protected from the corrosive effects of the process fluid by the noble-metal coating.

20 Claims, 1 Drawing Sheet

6,073,648

METAL ELEMENT HAVING A LAMINATED COATING

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

This invention pertains to industrial coatings for protecting a metal element in a corrosive environment, and particularly to a laminated coating used to protect valves, conduit, manufacturing equipment, and other elements that may be exposed to a highly corrosive and erosive environment.

2. Description of the Related Art

In an industrial application involving a highly corrosive and erosive environment, equipment wears quickly and must be replaced. Replacement involves the cost of the part as well as lost production time. U.S. Pat. No. 5,353,832, issued to Berchem, teaches a ball cock for fluids carrying abrasive materials. Passages are formed of an engineering material such as silicon carbide, silicon nitride, tungsten carbide and titanium carbide, which are referred to therein as ceramics. It has also been known to apply a layer of tantalum on a metal substrate and then apply a ceramic coating onto the tantalum. Although a ceramic coating may prove beneficial in an erosive environment, such coatings have not proven entirely satisfactory in an environment that is both erosive and corrosive.

SUMMARY OF THE INVENTION

To protect a metal substrate in a highly corrosive and erosive environment, a coating of a noble metal, such as gold, is bonded to the metal substrate, and a coating of a ceramic material is bonded to the noble-metal coating. The outer ceramic coating provides protection from erosion, but since ceramic materials are somewhat porous, corrosive fluid can seep through the ceramic coating. The underlying noble-metal coating protects the metal substrate from such corrosive fluid. A layer of copper can be interposed between the metal substrate and the noble-metal coating. A layer of tantalum can be interposed between the noble-metal coating and the ceramic coating.

DETAILED DESCRIPTION OF INVENTION

Figure 1:
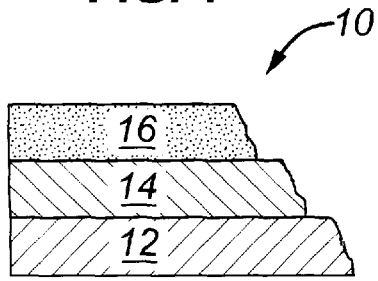
FIG. 1 is a typical cross section of a metal substrate having a layer of a noble metal and a layer of a ceramic material, according to the present invention.

With reference to FIG. 1, a metal element 10 is adapted for use in a highly corrosive and erosive environment, such as may be found in a gold mining operation. A corrosive environment can be either highly acidic or highly basic. A pH of 7.0 is neutral, and a pH ranging between 0 and 7 is acidic, while a pH ranging between 7 and 14 is basic. A highly acidic environment may, for example, have a pH less than about 4, and a highly basic environment may have a pH greater than about 10. Thus, a highly corrosive environment may typically have, but is not limited to, a pH ranging between about 0 and 4 or between about 10 and 14.

An erosive environment is typically one in which particulate matter is carried within a flowing fluid. The fluid may be a liquid or a gas, and the particulate matter is a hard, solid material that is suspended in and/or carried by the fluid. As the particulate matter strikes a surface, it erodes away the surface, leading to premature wear of the element having that surface. However, an erosive environment can also be caused by fluids that do not contain particulate matter or solids, such as high-pressure steam.

A highly corrosive and erosive fluid environment is generally an environment that is implied by the terms. However, deoxygenated and superheated water is highly corrosive, although its pH may range between 4 and 10. Superheated steam can be highly erosive, although it may not contain solids or particulate matter. Thus, a highly corrosive and erosive fluid environment may be an environment in which a metal substrate deteriorates too rapidly due to corrosion or erosion.

A metal substrate 12 is to be placed in service in a highly corrosive and erosive environment. For corrosion protection, a layer or coating of a noble metal 14 is bonded to metal substrate 12. Noble metals include gold, silver, platinum, palladium and alloys of these metals. The alloys may include combinations of these metals and/or these metals in combination with other materials. For particular applications, metals such as tin, zinc, niobium or columbium and the like behave as noble metals and are accordingly considered a noble metal herein. Such metals can provide adequate corrosion protection in various applications.

The noble metals that are more typically used include gold, platinum and palladium, as well as alloys containing these metals. In particular, gold is used in certain applications for its resistance to corrosion.

Noble-metal coating 14 can be bonded to metal substrate 12 by conventional techniques including, but not limited to, adhesion, electroplating, high-energy plasma, thermal spray and flame spray. Where noble-metal layer 14 comprises gold, electroplating can be used to deposit a layer of the gold material. One of many different flame spray technologies can also be used for depositing a layer of gold material. A high velocity oxygen fuel such as propylene or hydrogen can be used in the flame spray process. Also a high energy plasma can be used to deposit a layer of noble metal onto metal substrate 12. Such equipment for depositing a coating of noble metal is commercially available.

The thickness for a noble-metal coating may vary widely, as thickness is determined primarily by economic considerations as opposed to technical considerations. A noble-metal film may be as thin as a few microns. On the other hand a noble-metal coating may be about 0.060 inches thick or more. If a range of thickness of the noble-metal coating is to be given, it may be specified as ranging between about 0.0001 inches and about 0.040 inches. The thickness is somewhat related to the method of application. An electroplated film of gold may have a thickness ranging between about 15 and about 45 microns, where 45 microns is about 0.0017 inches. On the other hand gold may be applied by high-energy plasma deposition in incremental layers having a thickness of about 0.001 inch to achieve total thickness of about 0.015 inches.

Metal substrate 12 can be any metal or metal alloy and may be a coating itself, such as a nickel alloy. In a highly corrosive and erosive environment, metal substrate 12 may itself be corrosion-resistant material such as a titanium alloy, and it may be an exotic metal. Metal substrate 12 is typically roughened by a grit blast using aluminum oxide to a 250 to 350 ASTM surface finish prior to receiving a coating, such as a layer of gold. Metal substrate 12 may comprise all or any part of metal elements, such as valves, conduits, fluid-processing or fluid-handling equipment, manufacturing equipment, elements exposed to severe operating conditions and the like.

Noble-metal layer 14 protects metal substrate 12 from corrosion. However, noble metals are typically relatively soft and can erode easily. A ceramic coating 16 is bonded to noble-metal coating 14 for withstanding an erosive environment (FIG. 1). Ceramic materials are very hard and do not erode easily. Thus, ceramic coating 16 can withstand the erosive effects of a fluid carrying particulate matter. While a softer material would erode away, ceramic layer 16 is sufficiently hard to resist wear in an erosive or abrasive application.

However, ceramic coating 16 is somewhat porous, which allows corrosive fluid to seep through ceramic layer 16. Thus, if ceramic layer 16 were used without noble metal 14, corrosive material can attack metal substrate 12. With the combination of noble-metal coating 14 for withstanding corrosive effects and ceramic coating 16 for withstanding erosive or abrasive effects, metal substrate 12 has application in the most severe environments.

Ceramic materials typically have a porosity greater than about 1%, and a porosity of about 4 or 5% is typical for many ceramics. Sealants, such as glass materials, have been used to make ceramics impermeable in order to prevent corrosion of an underlying metal due to seepage through the ceramic of a process fluid. However, most of these sealants are ineffective above about 400° F., and it is believed all such sealants are ineffective above about 500° F. Thus, sealed ceramics have been less than fully satisfactory under severe operating conditions. An unsealed ceramic material can be used according to the present invention, where the unsealed ceramic material is one that has not been or cannot be sealed by conventional sealants.

Gold mining operations provide an example of severe operating conditions. A highly acidic solution containing about 98 weight percent sulfuric acid is maintained at temperatures as high as about 700 to 800° F. The solution further contains various salts, which makes the solution even more corrosive than it would otherwise be. Metal elements, such as valves, conduits, manufacturing equipment and the like corrode away very rapidly in such a highly corrosive solution. Sealed ceramics have failed in a matter of weeks or months under these conditions, and underlying metal substrates have deteriorated rapidly.

Noble-metal coating 14, which may be gold or an alloy thereof, is used to protect a metal substrate from this highly corrosive solution. Thus, an outer ceramic coating may allow some seepage of corrosive material, as sealants cannot function at such high temperatures, while an underlying layer of noble metal protects a metal substrate.

In a gold mining operation, such a solution also carries particulate material, such as sand, grit and ore, which abrades most surfaces in contact with the solution. Ceramic coating 14 can withstand the abrasive and erosive effects of a stream flowing with suspended particulate matter.

Figure 2:
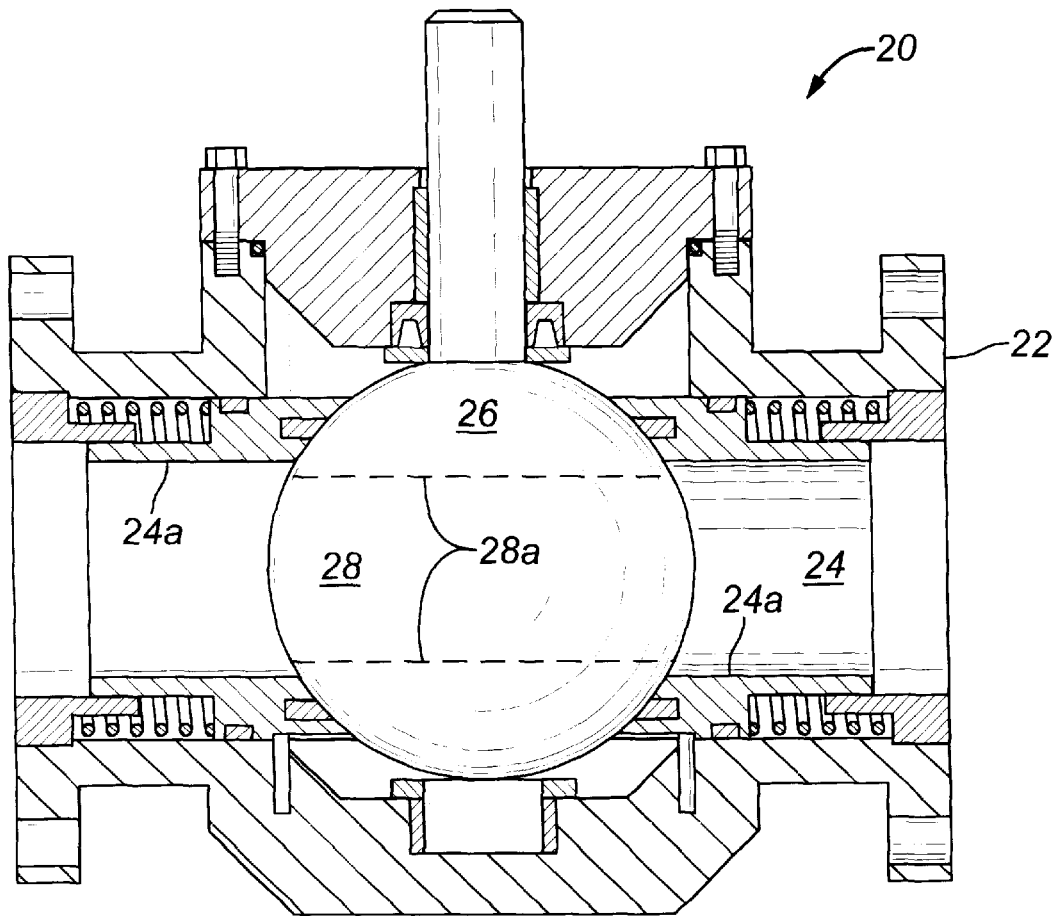
FIG. 2 is a cross section of a valve having a laminated coating for use in a highly corrosive and erosive environment, according to the present invention.

With reference to FIG. 2, a valve 20 is illustrated as a typical embodiment of the present invention. Valve 20 is a ball valve having a valve body 22, which has a passageway 24. A ball 26 having a bore 28 is disposed in passageway 24, and bore 28 is selectively alignable with passageway 24 for regulating fluid flow through passageway 24. Surface 24a defines fluid passageway 24, and surface 28a defines bore 28. Surfaces 24a and 28a comprise the wetted surfaces of valve 20.

Valve 20 may be used in a severe service having high corrosivity and high erosivity. Such a service may be in the chemical process, oil, steel or mining industries, although a severe service can be found in other industries. Surfaces 24a and/or 28a comprise a coating of a ceramic material, such as coating 16 in FIG. 1. Under the layer of ceramic material is a layer of a noble metal, such as noble-metal coating 14 in FIG. 1. The noble-metal layer protects the base metal of the valve body from corrosion, which may be caused by fluid seeping through pores in the outer ceramic layer.

The outer ceramic layer protects the soft, noble-metal layer from erosion, which may be caused by hard, solid material flowing through passageway 24 and bore 28. Thus, the ceramic layer protects against erosion and abrasion while the noble-metal layer protects against corrosion. All of the surfaces defining passageway 24 and bore 28 may have the layered coatings thus described or any particular element within valve 20 may be protected as described. In some applications it may be sufficient and desirable to coat only working surfaces, such as the ball and seat working surfaces in FIG. 2, gate valve seats and/or sealing surfaces, with coatings described herein.

Figure 3:
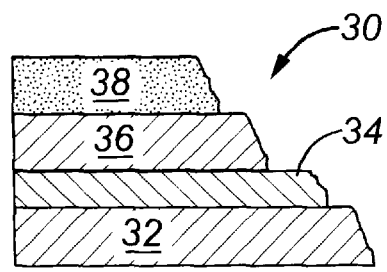
FIG. 3 is a typical cross section of a metal substrate having an inner layer of a copper material bonded to the metal substrate, an outer layer of a ceramic material and a middle layer of a noble metal, according to the present invention.

Turning now to FIG. 3, a metal element 30 is adapted for use in a severe service. The severe service may include a highly acidic or highly basic environment, as well as a highly erosive or abrasive environment. A metal substrate 32 would rapidly deteriorate in such a service. A layer or coating of copper 34 is bonded to metal substrate 32, and a noble-metal coating 36 is bonded to copper strike 34. Copper coating 34 is used in certain applications where a noble metal, such as gold, may not otherwise bond well to the metal substrate.

A ceramic coating 38 is bonded to noble-metal coating 36. Various ceramic materials are suitable for use as ceramic coating 16 in FIG. 1 or ceramic coating 38 in FIG. 3. These ceramic materials include, but are not limited to, aluminum oxide, titanium dioxide, chromium oxide, zirconium oxide, magnesium oxide, and silicon nitride. For purposes herein, ceramic materials also include the metals tungsten carbide, chromium carbide, silicon carbide and titanium carbide. However, none of the terms used here to define ceramic materials are necessarily proper chemical nomenclature for ceramics.

Coatings 14, 16, 34, 36 and 38 have thicknesses typically ranging between about 0.0001 inches and about 0.060 inches, preferably about 0.0001 to about 0.040 inches, although there may be applications where a thickness outside the broader range is desirable. Ceramic coatings 16 and 38 may be bonded to noble-metal coatings 14 and 36, respectively, by conventional methods, including high-energy plasma deposition, thermal spray and flame spray, such as by high velocity oxygen fuel.

In summary, a laminated coating has been described for protecting a metal substrate in a highly corrosive and erosive/abrasive environment. A coating of a noble metal, such as gold or platinum, is bonded to the metal substrate. Noble metals are unreactive and thus can withstand a corrosive environment. Further, noble metals are very dense, which prevents penetration therethrough. The noble-metal coating protects the metal substrate from the effects of a highly acidic or highly basic solution, which solution would otherwise deteriorate the metal substrate rapidly.

In the severe operating conditions contemplated for the present invention, an abrasive or erosive particulate matter would erode away the noble-metal coating. This problem is solved by applying a ceramic coating over the noble-metal coating so that the ceramic coating protects the noble-metal coating from the erosive/abrasive effects of effects of the solids and particulate matter in a flow stream.

A ceramic coating by itself over a metal substrate is not fully sufficient for protecting a metal substrate in a highly corrosive and erosive environment. For example, high-strength acid solutions can penetrate a ceramic material and attack an underlying metal substrate causing deterioration, which necessitates replacement of the component. Incorporating a noble-metal layer between the metal substrate and the outer ceramic coating prevents corrosion of the metal substrate. The noble-metal layer resists attack by corrosive materials, such as high-strength acids.

For particular metal substrates, it is desirable to include a layer of copper material bonded to the metal substrate. A noble-metal coating can then be bonded to the copper coating, where the noble-metal coating may not otherwise bond well to the underlying metal substrate. The ceramic coating can then be bonded to the noble-metal coating as has been described.

With reference to FIG. 1, a layer of tantalum (not shown) can be interposed between noble-metal layer 14 and ceramic layer 16. In this embodiment, a tantalum coating (not shown) is bonded to a noble-metal layer, and a ceramic coating is bonded to the tantalum coating. Tantalum has a high melting temperature and is believed to enable a metal element having such a laminated coating to better withstand high operating temperatures. Further, tantalum oxidizes under such conditions, and such oxidation has desirable properties for protecting a metal substrate.

A tantalum coating (not shown) can also be interposed between noble-metal coating 36 and ceramic coating 38 in FIG. 3. In this embodiment, a metal element has a metal substrate and a laminated coating including a copper coating bonded to the metal substrate, a noble-metal coating bonded to the copper coating, a tantalum coating (not shown) bonded to the noble-metal coating and a ceramic coating bonded to the tantalum coating. This laminated coating has the desirable properties previously described, as well as providing a layer of copper material as a bonding layer to the metal substrate. As an alternative to using copper as a bond coat, a conventional bond coat comprising about 95 weight percent nickel and about 5 weight percent aluminum may be used. In such case, the bond coat is considered a portion of the metal substrate, and a noble-metal coating can be bonded to such substrate according to the present invention.

In FIG. 2, a valve has been described as one embodiment of the present invention. However, numerous applications are anticipated for the laminated coatings described herein. Applications include, but are not limited to, valves, conduits, manufacturing equipment, compressor and pump rods, plungers in pumps and compressors, turbine fans in jet engines and pump and compressor impellers. Subcomponents, such as valve seats for a gate valve, are also contemplated. Another example of the severe environment in which a laminated coating according to the present invention may be used is an application in which super-heated steam is conveyed. In this application, the process fluid, superheated steam, is erosive although essentially no particular matter is carried by the process stream. Erosion can still occur due to high velocities, which typically result from large pressure drops across an element in a flow system.

An article of manufacture has thus been described that is suitable for service in a highly corrosive and highly erosive/abrasive fluid environment. The combined problems of corrosivity and erosivity have thus been solved. Components having a laminated coating described herein have a longer service life, which improves overall productivity by increasing run time of equipment and reducing downtime, which increases production rates. Material and labor costs are also reduced. With a laminated coating described herein, a less-expensive metal substrate can be used than would otherwise be used in a corrosive environment because the metal substrate is protected from corrosion. Thus, a less-corrosion-resistant, and hence less-expensive, base metal can be used.

The foregoing disclosure and description of the invention are illustrative and explanatory thereof, and various changes in the details of the illustrated apparatus and construction and method of operation may be made without departing from the spirit of the invention.

We claim:

1. A metal element adapted to withstand erosion and corrosion, comprising:
   a metal substrate;
   a coating of a noble metal bonded to the substrate; and
   a coating of a ceramic material bonded to the noble metal.

2. The metal element of claim 1, wherein the noble metal is selected from the group consisting of gold, silver, palladium, platinum and alloys including these metals.

3. The metal element of claim 2, wherein the noble metal is gold.

4. The metal element of claim 1, wherein the ceramic material is selected from the group consisting of aluminum oxide, titanium dioxide, chromium oxide, zirconium oxide, magnesium oxide, silicon nitride, tungsten carbide, chromium carbide, silicon carbide, and titanium carbide.

5. The metal element of claim 1, wherein the ceramic material is selected from the group consisting of aluminum oxide, titanium dioxide, chromium oxide, zirconium oxide, magnesium oxide, and silicon nitride.

6. The metal element of claim 1, wherein the metal substrate is a portion of a valve.

7. The metal element of claim 6, wherein the noble metal is gold.

8. The metal element of claim 7, wherein the ceramic material is selected from the group consisting of aluminum oxide, titanium dioxide, chromium oxide, zirconium oxide, magnesium oxide, silicon nitride, tungsten carbide, chromium carbide, silicon carbide, and titanium carbide.

9. The metal element of claim 8, wherein the ceramic material has a porosity of at least about 1 percent.

10. A valve for use in a highly corrosive and erosive environment, comprising:
    a valve body having a flow passageway; and
    a valve element attached to or integral with the valve body, wherein the valve element has a surface defining the fluid passageway,
    the valve element comprising:
        a metal substrate;

a coating of a noble metal bonded to the metal substrate; and a ceramic coating bonded to the noble-metal coating.

11. The valve of claim 10, wherein the noble metal is selected from the group consisting of gold, silver, palladium, platinum and alloys including these metals.

12. The valve of claim 11, wherein the noble metal is gold.

13. The valve of claim 10, wherein the ceramic coating is selected from the group consisting of aluminum oxide, titanium dioxide, chromium oxide, zirconium oxide, magnesium oxide, silicon nitride, tungsten carbide, chromium carbide, silicon carbide, and titanium carbide.

14. The valve of claim 13, wherein the ceramic is chromium oxide.

15. A metal element adapted to withstand a highly corrosive and erosive environment, comprising:

a metal substrate;

a coating of copper bonded to the metal substrate;

a coating of a noble metal bonded to the copper coating; and a coating of a ceramic material bonded to the noble metal.

16. The metal element of claim 15, wherein the noble metal is gold.

17. A metal element adapted to withstand a highly corrosive and erosive environment, comprising:

a metal substrate;

a coating of a noble metal bonded to the substrate;

a coating of tantalum bonded to the noble-metal coating; and a coating of a ceramic material bonded to the tantalum coating.

18. A metal element adapted to withstand a highly corrosive and erosive environment comprising:

a metal substrate;

a coating of a copper material bonded to the metal substrate;

a coating of a noble metal bonded to the copper coating;

a coating of tantalum bonded to the noble-metal coating; and a coating of a ceramic material bonded to the tantalum coating.

19. A metal element adapted for use in a corrosive fluid environment, the fluid having an operating temperature over about 500° F., comprising:

a metal substrate;

a first layer of gold, platinum or palladium bonded to the substrate; and a second layer of aluminum oxide, titanium dioxide, chromium oxide, zirconium oxide, magnesium oxide, or silicon nitride bonded to the first layer.

20. The metal element of claim 19, wherein the second layer has a porosity of at least about 1 percent.

* * * * *

UNITED STATES PATENT AND TRADEMARK OFFICE
CERTIFICATE OF CORRECTION

PATENT NO. : 6,073,648

DATED : June 13, 2000

INVENTOR(S) : James L. Watson, et al.

It is certified that error appears in the above-identified patent and that said Letters Patent is hereby corrected as shown below:

On the title page, item [56] insert the following:

U.S. PATENT DOCUMENTS

| DOCUMENT NUMBER | DATE | NAME | CLASS | SUBCLASS |
|---|---|---|---|---|
| 5,981,091 | 11/9/99 | Rickerby et al. | 428 | 670 |
| 5,935,485 | 8/10/99 | Tani et al. | 252 | 62.9 PZ |
| 5,897,947 | 4/27/99 | Funk | 428 | 325 |
| 5,856,027 | 1/5/99 | Murphy | 428 | 623 |
| 5,843,585 | 12/1/98 | Alperine et al. | 428 | 623 |
| 5,817,371 | 10/6/98 | Gupta et al. | 427 | 454 |
| 5,763,107 | 6/9/98 | Rickerby et al. | 428 | 623 |
| 5,693,427 | 12/2/97 | Moysan, III et al. | 428 | 627 |
| 5,427,866 | 6/27/95 | Nagaraj et al. | 428 | 610 |
| 5,055,361 | 10/8/91 | Dunn et al. | 428 | 633 |
| 5,047,381 | 9/10/91 | Beebe | 502 | 304 |

UNITED STATES PATENT AND TRADEMARK OFFICE
CERTIFICATE OF CORRECTION

PATENT NO. : 6,073,648

DATED : June 13, 2000

INVENTOR(S) : James L. Watson, et al.

It is certified that error appears in the above-identified patent and that said Letters Patent is hereby corrected as shown below:

| 4,975,314 | 12/4/90 | Yano et al. | 428 | 213 |
| 4,917,968 | 4/17/90 | Tuffias et al. | 428 | 621 |
| 4,761,346 | 8/2/88 | Naik | 428 | 627 |
| 4,746,582 | 5/24/88 | Tsuno | 428 | 627 |
| 4,338,360 | 7/6/82 | Cavanagh et al. | 427 | 247 |
| 4,328,286 | 5/4/82 | Crosby | 428 | 636 |

Signed and Sealed this

Twenty-second Day of August, 2000

Attest:

Q. TODD DICKINSON

*Attesting Officer*  *Director of Patents and Trademarks*